July 12, 1966
H. H. ASH ETAL
3,260,480
AERIAL BALLOON SYSTEM
Filed Aug. 18, 1964
2 Sheets-Sheet 1
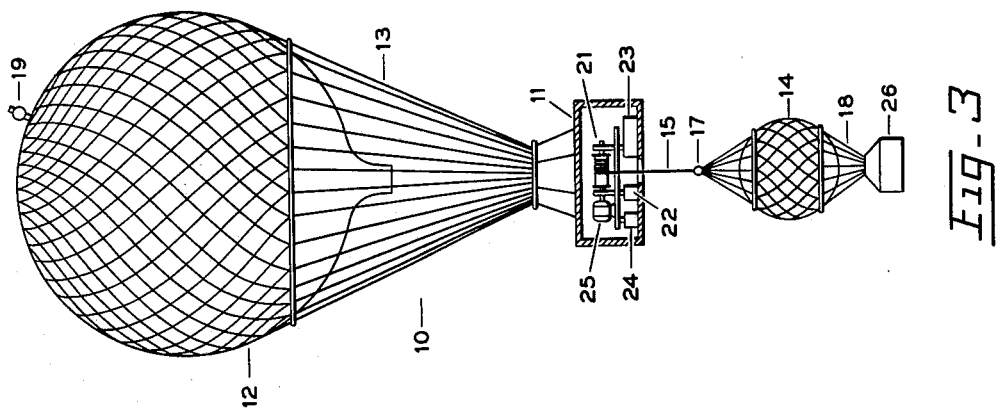
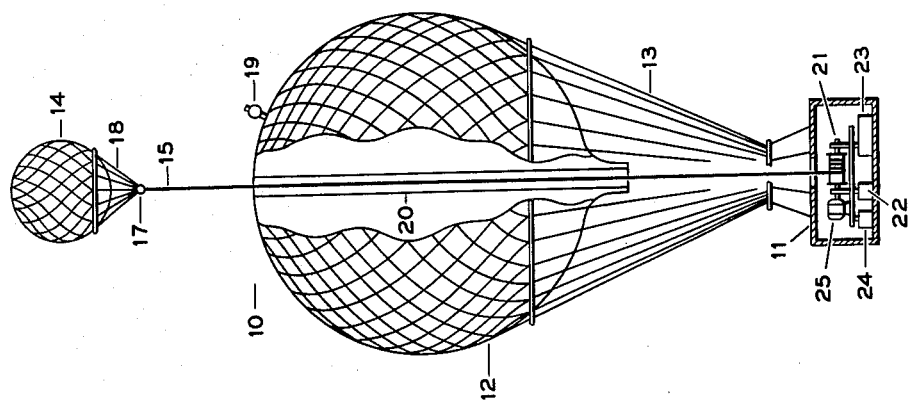
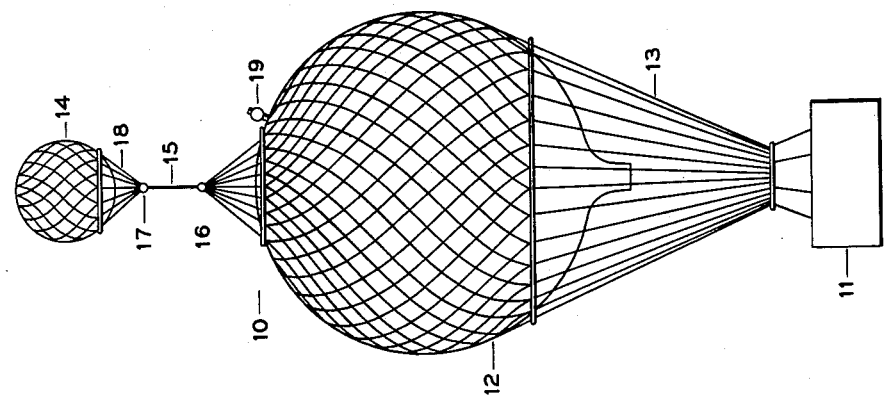
INVENTOR.
HOWARD H. ASH
BY ARNOLD L. ROSENBLATT
ATTORNEY

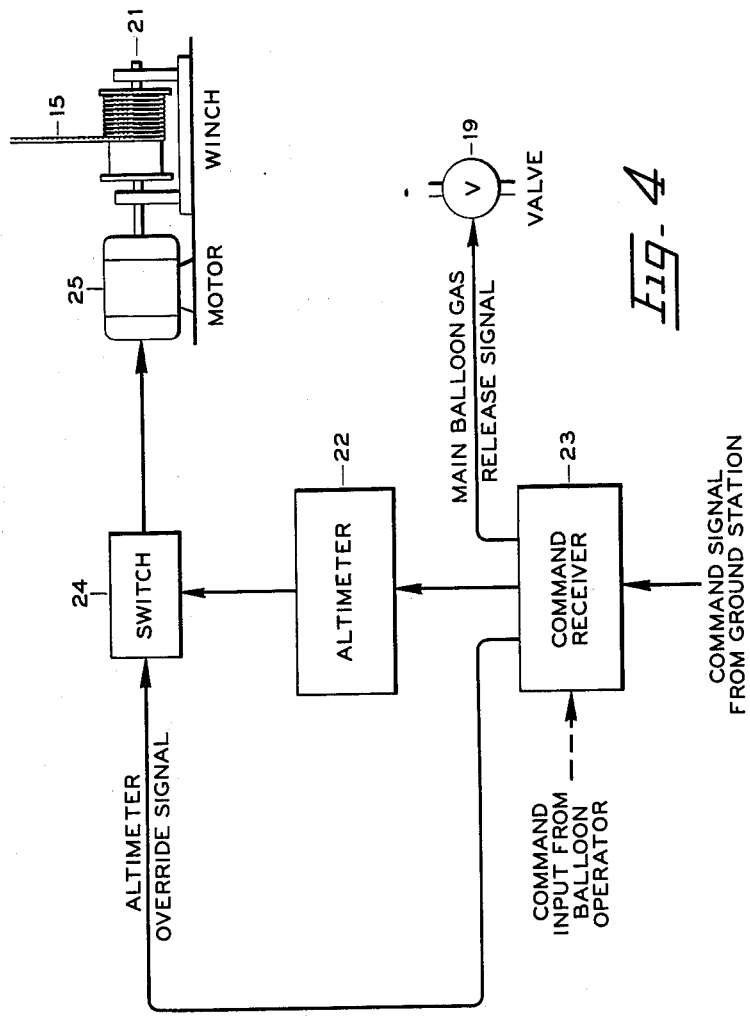

United States Patent Office 3,260,480
Patented July 12, 1966

3,260,480
AERIAL BALLOON SYSTEM
Howard H. Ash, Huntington, and Arnold L. Rosenblatt, Massapequa Park, N.Y., assignors, by mesne assignments, to Fairchild Hiller Corporation, Hagerstown, Md., a corporation of Maryland
Filed Aug. 18, 1964, Ser. No. 390,377
14 Claims. (Cl. 244—31)

This invention relates in general to aerial balloons and, more particularly, to aerial balloon systems for lifting and supporting a gondola, or payload associated therewith.

In general, the present invention contemplates an aerial balloon system including a plurality of balloons for applying a selected force or lift to a gondola associated therewith, whereby said gondola is maintained at a predetermined altitude or range of altitudes. More particularly, the balloon system proposed herein comprises a main balloon which provides the principal lifting force to support a gondola, and an auxiliary balloon associated therewith for selectively applying a force to compensate for variations in the lifting force of the main balloon whereby the total lift of the system may be adjusted so as to support the gondola at a predetermined altitude or range of altitudes.

One of the problems involved in supporting a gondola containing an observation or data collection station in the atmosphere by means of a conventional, zero-pressure (i.e., a balloon in which the pressure of the lift-producing gas contained therein is substantially equal to the ambient atmospheric pressure) is the effect of radiational heating and cooling of the balloon and its gas.

This radiational heat transfer causes the lift capability of such a balloon to vary between day and night and as a result its altitude and the altitude of any station which it carries also varies.

In brief, a zero-pressure balloon designed to reach equilibrium at a particular altitude during the daylight hours will lose altitude at sunset and during the night. This loss of lift associated with zero-pressure balloons imposes severe limitations on their use for flights of extended duration. To maintain a desired altitude with such balloons it has been necessary to carry large quantities of sand, water or other ballast and to overcome the loss of lift by dropping quantities of such ballast each evening at sunset. This has required the use of oversized balloons or a reduction in the portion of gross weight available for payload.

In any event, to maintain a zero-pressure balloon at a selected altitude presents many problems.

Super-pressure balloons (i.e., balloons in which the internal gas pressure is greater than the ambient atmospheric pressure) are relatively free from the loss-of-lift effects experienced by zero-pressure balloons under sunset and nighttime operations and are potentially capable of remaining at a relatively constant altitude for many days without ballasting. However, super-pressure balloons are subjected to high skin stresses, a factor which has restricted their use to relatively small sizes and consequently light payload applications.

The aforementioned limitations of zero-pressure and super-pressure balloons used individually can be overcome by a balloon system which uses a zero-pressure balloon in combination with a super-pressure balloon to support a gondola, and wherein the super-pressure balloon is so positioned relative to the zero-pressure balloon as to provide a selected degree of compensation for variation in the lift capacity of the zero-pressure balloon.

Accordingly, it is an object of the present invention to provide an aerial balloon system which overcomes the aforesaid limitations of individual zero-pressure and super-pressure balloons by providing a zero-pressure main balloon of sufficient lift capacity to sustain a gondola or payload at a desired altitude and a super-pressure auxiliary balloon associated therewith to compenste for variations in the lift capacity of the main balloon.

It is a further object of this invention to provide an aerial balloon system capable of flights of extended duration and at predetermined altitudes, and with increased payload weight capabilities.

Another object of this invention is to provide an aerial balloon system having a capability for controlling the altitude of its payload within preselected limits without the necessity of releasing ballast or valving the buoyant gas.

These and other objects and advantages of this invention will become more apparent from the following description and drawings, wherein:

FIG. 1 is a side view of an aerial balloon system embodying the invention wherein compensation for variations in the lifting capability of a main zero-pressure balloon is provided by an auxiliary super-pressure balloon disposed at a selected distance above said main balloon and associated gondola.

FIG. 2 is a side view, partially in section, of an aerial balloon system contemplated herein wherein compensation for variations in the lifting capability of the main balloon is provided by an auxiliary super-pressure balloon disposed above said main balloon and an associated gondola, and means are included for controlling the relative positions of the main and auxiliary balloons so that the compensating lift produced by the auxiliary balloon can be varied as desired or required.

FIG. 3 is a side view, partially in section, of an aerial balloon system which is basically similar to the system shown in FIG. 2, but is distinguished therefrom in that the compensation for variations in the lifting capability of the main balloon is provided by an auxiliary super-pressure balloon disposed below said main balloon and an associated gondola.

FIG. 4 is a schematic of an apparatus for controlling the relative positions of the main and auxiliary balloons of the instant invention thereby permitting the compensating lift produced by the auxiliary balloon to be varied as desired or required.

Referring now to FIG. 1 which shows a balloon system 10 including a gondola or payload 11, a main balloon 12, a harness 13 which connects the payload 11 to the main balloon 12, an auxiliary balloon 14, and a cable 15 which connects the auxiliary balloon 14 to the main balloon 12. As shown therein, the payload 11 is suspended beneath the main balloon 12 by means of the conventional harness 13. The main balloon 12 is constructed as a conventional zero-pressure balloon, i.e., a balloon in which the internal gas pressure is substantially equal to the ambient atmospheric pressure acting on its exterior surface. The end 16 of the cable 15 is attached to the harness 13 of the balloon 12, and the other end 17 of said cable 15 is attached to a harness 18 of the auxiliary balloon 14.

The main balloon 12 is provided with a conventional valve 19 for releasing the buoyant gas contained therein when it is desired to cause the system 10 to descend, as for example, at the end of its mission. Since the balloon 12 is a zero-pressure balloon, the valve 19 is preferably located adjacent to the top portion of said balloon 12, to facilitate the release of the gas. The valve 19 may be operated by any conventional means, or by the means described hereinafter in connection with FIG. 4.

The auxiliary balloon 14 is also inflated with a buoyant gas, the pressure of which is such that the internal pressure of the balloon 14 is greater than ambient atmospheric pressure at altitudes equal to and greater than the minimum operational altitude, and at the minimum operating temperature expected. Thus, as a super-pressure balloon, the auxiliary balloon 14 will not be subjected to changes in volume, and its lift will be dependent principally upon the density of the surrounding, or ambient air. Moreover, the balloon 14 will be relatively immune from the radiational heat transfer effects to which zero-pressure balloons are subjected.

In general, the altitude limits of the balloon system 10 shown in FIG. 1 and its payload 11 are established by the lift characteristics of the main and auxiliary balloons 12 and 14 respectively, and the length of the cable 15. The lift of the main balloon 12 reaches a maximum during the day-light hours when radiational heating causes the gas contained therein to expand, thereby increasing the volume of said bolloon 12. Accordingly, the high altitude limit of the payload 11 corresponds to the aforesaid condition of maximum lift. Conversely, the lift of the main balloon 12 decreases to a minimum during the night when the gas contained therein becomes cooled, thereby causing the volume of the balloon 12 to shrink. Consequently, the low altitude limit of the payload 11 corresponds to the aforesaid condition of minimum lift. However, the volume of the auxiliary super-pressure balloon 14 is substantially constant and independent of radiational heat transfer, and thus the lift of said balloon varies only with the density of its surrounding atmosphere. According, the lift of the auxiliary balloon 14 will decrease with increasing altitude, and range from a maximum at the lowest altitude where full inflation exists to a minimum at its equilibrium altitude.

By using the lift of the auxiliary balloon 14 together with that of the main balloon 12 to support the payload 11, some compensation for variations in the lift of the main balloon 12 can be provided. As shown in FIG. 1, the auxiliary balloon 14 is held at a fixed distance above the payload 11 and connected thereto through the cable 15 and harnesses 13 and 18. During daylight, when the main balloon 12 exerts maximum lift, the payload 11 rises to an altitude at which the lift of the main balloon 12 and the additional lift of the auxiliary balloon 14 equals the total weight of the system 10. This altitude is the high altitude limit for the payload 11. At sunset, the main balloon 12 loses lift and as a result, the payload 11 starts to descend to a lower altitude. As the main balloon 12 loses altitude, the cable 15 causes the auxiliary balloon 14 to descend along with the main balloon 12 and payload 11. As the balloons 12 and 14 descend, the increasing density of the ambient atmosphere causes an increase in the lift of the super-pressure balloon 14. After sunset the main balloon 12 will continue to lose lift until at some time during the night it has reached its minimum lift. This minimum lift plus the lift contribution of the auxiliary balloon 14 now establishes the low altitude limit for the payload 11. In short, the balloon 14 now contributes a compensating lift to the end that the sum of the lifts produced by the main balloon 12 and the auxiliary balloon 14 support the payload 11 at a predetermined altitude. To the extent that the auxiliary balloon 14 is below its equilibrium altitude (i.e., that at which the atmospheric density is just sufficient to support it), the length of the cable 15 establishes the altitude of said balloon 14 for a given payload 11 altitude and, hence, controls the lift contribution of said balloon 14. Thus, by selecting an appropriate length for the cable 15 and balloons 12 and 14 having suitable lift characteristics relative to the total weight at the system 10, the operational altitude of the payload 11 may be confined within desired limits.

As shown in FIG. 1, the length of the cable 15 is such that the auxiliary balloon 14 is held below its equilibrium altitude and the cable 15 is maintained in tension. If desired, the cable 15 may be of greater length to permit the auxiliary balloon 14 to rise to its equilibrium altitude where its lift is just sufficient to support its own weight plus that of the cable 15. In this instance, no lift is contributed by the balloon 14 until the main balloon 12 descends.

The aerial balloon system 10 hereinbefore described may be modified to include means for adjusting the relative positions of the balloons 12 and 14 by varying the length of the cable 15 to the end that the lift contribution of the auxiliary balloon 14 may be varied as required to maintain the payload 11 at a selected altitude or within a desired range of altitudes.

As shown in FIG. 2, the cable 15 extends from the harness 18 through a duct or passage 20 provided in the balloon 12, said passage 20 being disposed generally about the vertical axis of said balloon 12, and thence through a suitable opening (not shown) in the payload 11 to a conventional winch 21 mounted in the payload 11. As will be hereinafter explained, the winch 21 is operable to reel in or pay out the cable 15 to adjust the position of the balloon 14 relative to the balloon 12 and thereby increase or decrease the lift contributed by the balloon 14 to the balloon system 10.

More particularly, apparatus (shown schematically in FIG. 4) is provided for controlling the relative positions of the balloons 12 and 14 to establish the altitude of the payload 11.

This control may be exercised through the aforesaid apparatus either automatically and remotely by means of radio signals transmitted from a ground station (not shown) or directly by means of command inputs from an operator (not shown) present within the payload 11.

Referring now to FIG. 4, an altimeter 22, similar to the type used in automatic pilot systems in that it is constructed and arranged to produce error signals in response to changes of altitude relative to a command or reference altitude or range of altitudes set therein, is suitably mounted in the payload 11. The altimeter 22 may be either of the barometric- or radar-operated type, its function being to generate error signals indicating the altitude of the payload 11 with respect to a command or referenced altitude or range of altitudes set therein. The altimeter 22 is operatively connected to a command receiver 23 whereby the command or referenced altitude may be set within the altimeter 22, either manually or in response to a radio signal. The altimeter 22 is also operatively associated with a switch 24 that is responsive to error signals received from the altimeter 22 to operate a reversible motor 25 so as to drive the winch 21 in one direction to reel in the cable 15 and in the opposite direction to pay out the cable 15. The foregoing elements are so constructed and arranged that the altitude at which it is desired to maintain the payload 11 may be set in the altimeter 22 as the command or reference altitude through the command receiver 23. In the event the payload 11 descends below the command altitude the altimeter 22 generates an error signal that is transmitted to and operates the switch 24 in a manner whereby the motor 25 drives the winch 21 to reel in the cable 15 and thereby draws the auxiliary balloon 14 toward the main balloon 12. The auxiliary balloon 14 now contributes a greater or increased lift to the balloon system 10 and as a result, the balloon system 10, including its payload 11, rises or gains altitude. When the payload 11 reaches the command or referenced altitude set in the altimeter 22, the error signal is at null and the switch 24 stops the motor 25 and, hence, the winch 21. Should the payload 11 rise above the command or referenced altitude set in the altimeter 22, an error signal is generated whereby the switch 24 operates the motor 25 to pay out the cable 15, permitting the auxiliary balloon 14 to move away from the main balloon 12 and thus decrease its contributing lift.

The command receiver 23 is also operatively connected directly to the switch 24 to the end that an override of the altimeter 22 is established. Thus, the command receiver 23 is capable of controlling the operation of the switch 24 and, hence, the motor 25 of the winch 21, independently of the altimeter 22.

As hereinbefore set forth, the main balloon 12 is provided with a conventional vent valve 19 whereby the buoyant gas contained within the main balloon 12 may be emptied or vented. The command receiver 23 is also operatively connected directly to the vent valve 19 to the end that it may be operated in response to signals received from the command receiver 23. Accordingly, at the end of a mission, or at any other time, the main balloon 12 may be vented.

As shown in FIGS. 1 and 2, the aerial balloon system contemplated herein has the super-pressure or auxiliary balloon 14 generally disposed above the main balloon 12. In this arrangement, the auxiliary balloon 14 exerts a contributing or compensating lift that acts generally in an upward direction to increase the lift capabilities of the main balloon 12. Stated differently, in this arrangement the compensating lift of the auxiliary balloon 14 is an additive or positive lift.

An alternate arrangement is shown in FIG. 3 wherein the auxiliary balloon 14 is generally positioned below the main balloon 12. In this arrangement, the cable 15 extends through a suitable opening (not shown) in the bottom of the payload 11, and the end 17 thereof is secured by any conventional coupling means (not shown) to the top or upper portion of the harness 18 of the auxiliary balloon 14. A ballast or mass 26 is secured in a similar manner to the lower or bottom portion of the harness 18 so as to suspend the ballast 26 and balloon 14 beneath the payload 11. The foregoing elements are so constructed and arranged that when the cable 15 is paid out by the winch 21, the ballast 26 will move the auxiliary balloon downwardly and away from the main balloon 12. As the auxiliary balloon 14 descends, the downward pull exerted by the ballast 26 on the balloon system 10 is decreased by the amount which the lift of the balloon 14 is increased. On the other hand, when the winch 21 is operated to reel the cable 15 in and thus move the balloon 14 closer to the main balloon 12, the resulting movement of the balloon 14 into the less dense atmosphere has the effect of increasing the downward pull on the balloon system 10.

Thus, in effect, the weight of the ballast 26 provides a fixed negative or downward bias force which can be offset by the lift of the auxiliary balloon 14. Since the resultant force transmitted by the cable 15 is used to compensate the balloon system 10 for variations in the lifting capability of the main balloon 12, said resultant force being the algebraic sum of the negative bias force produced by the ballast 26 weight and the positive, or upward force produced by the lift of the auxiliary balloon 14, and because in the arrangement shown by FIG. 3 this resultant force is inherently negative when the balloon 14 is below the main balloon 12, the compensating effect provided by the lift of the balloon 14 may be expressed in terms of a negative lift contribution to the main balloon 12.

It is apparent, therefore, that in this arrangement when the auxiliary balloon 14 is positioned closer to the main balloon 12, the negative lift contribution of the auxiliary balloon 14 is at its maximum value and as the auxiliary balloon 14 moves downwardly and away from the main balloon 12 this negative lift is reduced. Accordingly, the contributing or compensating lift of the auxiliary balloon 14 exerted on or applied to the main balloon 12 is the same as the arrangement shown in FIGS. 1 and 2, as well as that shown in FIG. 3 in that the compensating lift of the auxiliary balloon 14 is at a maximum when it is closest to the main balloon 12 and decreases as the auxiliary balloon 14 moves away from the main balloon 12. In the case of the arrangement shown in FIGS. 1 and 2, the compensating lift is positive whereas in the arrangement shown in FIG. 3, it is negative. In all other respects, the apparatus shown in FIG. 4 and hereinbefore described for operating the winch 21 to reel in or pay out the cable 15 and thereby adjust the position of the auxiliary balloon 14 relative to the main balloon 12, is the same. Thus, the altitude at which it is desired to maintain the payload 11 is set in the altimeter 22 through the command receiver 23. Should the payload 11 descend below this command or referenced altitude, the altimeter 22 generates an error signal that operates the switch 24 in a manner to cause the winch 21 to pay out the cable 15. As a result, the auxiliary balloon 14 descends and the negative lift exerted thereby on the main balloon 12 is decreased. The main balloon 12 then rises toward the command or referenced altitude set in the altimeter 22. Conversely, should the payload 11 ascend or rise above the command altitude, the error signal from the altimeter 22 will be such that the switch 24 will operate the motor 25 and the winch 21 in such a manner as to reel in the cable 15 thus drawing the auxiliary balloon 14 toward the main balloon 12 to increase the negative compensating lift of the auxiliary balloon 14. This will cause the payload 11 to descend to the command or referenced altitude set in the altimeter 22.

In the arrangements shown in FIGS. 1, 2, and 3, the main balloon 12 and the auxiliary balloon 14 are so designed and constructed that when the payload 11 is at the altitude at which it is desired to maintain the same, the auxiliary balloon 14 will contribute a selected compensating lift, either positive or negative, to the balloon system. Accordingly, the length of the cable 15 should be such that under these conditions, a portion thereof is paid out from the winch 21, so as to permit movement of the auxiliary balloon 14 either toward or away from the main balloon 12 to vary the compensating lift exerted thereby on the main balloon 12.

What is claimed is:

1. An aerial balloon system for supporting a payload, said system comprising a zero-pressure balloon, a super-pressure balloon, said zero-pressure balloon and super-pressure balloon containing therein a buoyant gas and means connecting said balloons to said payload.

2. An aerial balloon system for supporting a payload, said system comprising a variable-volume balloon, a fixed-volume balloon, said variable volume balloon and said fixed volume balloon containing therein a buoyant gas and means connecting said balloons to said payload.

3. An aerial balloon system comprising a payload, a zero-pressure balloon, means connecting said payload to said zero-pressure balloon, and balloon means connected to said payload for compensating for variations in the lifting capability of the zero-pressure balloon, both of said balloons containing therein a buoyant gas.

4. An aerial balloon system for supporting a payload comprising a first zero pressure balloon providing the principal lifting force to said system, and a second super-pressure balloon providing an auxiliary lifting force to said system, said first and second balloons containing a buoyant gas.

5. An aerial balloon system for supporting a payload comprising first zero pressure lift-producing means for supporting said payload at a selected range of altitudes under particular ambient atmospheric conditions, and second super pressure lift-producing means for applying a compensating lift to said payload to compensate for variations of the lift produced by said first lift-producing means in response to changes in ambient atmospheric conditions at the selected range of altitudes.

6. An aerial balloon system for supporting a payload, said system comprising a zero-pressure balloon, means connecting said zero-pressure balloon to said payload, a super-pressure balloon, and means of predetermined length connecting said zero- and super-pressure balloons.

7. An aerial balloon system for supporting a payload comprising a first zero-pressure balloon providing the principal lifting force to said system, a second super-pressure balloon providing an auxiliary lifting force to said system, and means for varying the relative positions of said first and second balloons.

8. An aerial balloon system for supporting a payload, said system comprising a zero-pressure balloon, means connecting said zero-pressure balloon to said payload, a super-pressure balloon, and an adjustable length connection between said balloons.

9. An aerial balloon system for supporting a payload, a first zero-pressure balloon providing the principal lifting force to said system, a second super-pressure balloon providing a lifting force to said system to compensate for variations in the principal lifting force of said first balloon, and means responsive to changes in altitude of said payload relative to a selected altitude for varying the positions of said first and second balloons to thereby vary the compensating lifting force of said second balloon.

10. An aerial balloon system for supporting a gondola at a selected altitude, said system comprising a first zero-pressure balloon, means connecting said first balloon to said gondola, a second super-pressure balloon, variable length means connecting said second balloon and said gondola, and means for controlling said variable length means whereby said balloons are positioned in a spaced relationship.

11. An aerial balloon system for supporting a gondola at a selected altitude, said system comprising a first zero-pressure balloon, means connecting said first balloon to said gondola, a second super-pressure balloon, variable length means connecting said gondola to said second balloon, and altitude-responsive means for controlling said variable length means whereby said balloons are positioned in a spaced relationship as a function of the altitude of said gondola.

12. An aerial balloon system for supporting a gondola at a selected altitude, said system comprising a first zero-pressure balloon, means connecting said first balloon to said gondola, a second super pressure balloon, variable length means connecting said gondola to said second balloon, altitude-responsive means for controlling said variable length means whereby said balloons are positioned in a spaced relationship as a function of the altitude of said gondola, and means for overriding said altitude-responsive means for controlling said variable length means.

13. An aerial balloon system for supporting a gondola at a selected altitude, said system comprising a first balloon, means connecting said first balloon to said gondola, a second balloon, a winch carried by said gondola, a cable operatively connected between said winch and said second balloon, means for controlling the operation of said winch, said control means including an altimeter for sensing the difference between the actual altitude and a selected altitude and generating a signal in response thereto for operating said winch whereby the length of said cable is varied and the relative positions of said balloons are adjusted, and a command receiver for setting a selected altitude in said altimeter.

14. An aerial balloon system for supporting a gondola at a selected altitude, said system comprising a first balloon, means connecting said first balloon to said gondola, a second balloon, variable length means including a cable and a winch for connecting said balloons, means for controlling said variable length means as a function of altitude, said control means including an altimeter for sensing the difference between the actual altitude and a selected altitude and for generating a signal in response thereto, and a command receiver for setting a selected altitude in said altimeter.

References Cited by the Examiner

UNITED STATES PATENTS

| 213,603 | 3/1879 | Apraxine | 244—33 |
| 1,834,614 | 12/1931 | Hall | 244—97 |
| 2,524,567 | 10/1950 | Isom | 244—97 |

FOREIGN PATENTS 2,313      1877    Great Britain.

MILTON BUCHLER, *Primary Examiner.*

R. G. BESHA, T. MAJOR, *Assistant Examiners.*